US010865556B2

(12) United States Patent
Wright

(10) Patent No.: US 10,865,556 B2
(45) Date of Patent: Dec. 15, 2020

(54) EXTENDER FOR VEHICLE SEWER CONNECTION

(71) Applicant: Jeffery Wright, Clements, CA (US)

(72) Inventor: Jeffery Wright, Clements, CA (US)

( * ) Notice: Subject to any disclaimer, the term of this patent is extended or adjusted under 35 U.S.C. 154(b) by 315 days.

(21) Appl. No.: 15/984,041

(22) Filed: May 18, 2018

(65) Prior Publication Data

US 2019/0352893 A1 Nov. 21, 2019

(51) Int. Cl.
*E03F 1/00* (2006.01)

(52) U.S. Cl.
CPC .................................... *E03F 1/008* (2013.01)

(58) Field of Classification Search
CPC ............................. E03F 1/008; F16L 27/0841
USPC ..... 285/32, 34, 145.1, 145.4, 247, 248, 249, 285/302
See application file for complete search history.

(56) References Cited

U.S. PATENT DOCUMENTS

| 1,200,118 | A | * | 10/1916 | Keeler | .................. | F16L 37/252 |
| | | | | | | 285/362 |
| 3,224,800 | A | * | 12/1965 | Fisher | .................. | A47B 91/024 |
| | | | | | | 403/118 |
| 3,355,201 | A | * | 11/1967 | Barwick | ................. | F16C 3/026 |
| | | | | | | 403/374.4 |
| 3,659,880 | A | * | 5/1972 | Goldsobel | ................. | F16L 5/12 |
| | | | | | | 285/149.1 |
| 4,650,224 | A | * | 3/1987 | Smith | ..................... | E03F 1/008 |
| | | | | | | 137/899 |
| 4,722,556 | A | | 2/1988 | Todd | | |
| 4,758,027 | A | | 7/1988 | Todd | | |
| 4,796,926 | A | | 1/1989 | Rapsilver | | |
| 4,805,444 | A | | 2/1989 | Webb | | |
| 5,915,411 | A | | 6/1999 | Gilbert | | |
| 5,971,438 | A | * | 10/1999 | Johnson | .................... | E03F 1/00 |
| | | | | | | 285/12 |
| 6,123,367 | A | | 9/2000 | Miller | | |
| 6,609,847 | B1 | * | 8/2003 | Wang | ..................... | A46B 11/06 |
| | | | | | | 15/144.4 |

(Continued)

OTHER PUBLICATIONS

Wright, U.S. Appl. No. 29/648,232, filed May 18, 2018, Office Action, dated Nov. 6, 2019.

(Continued)

*Primary Examiner* — James M Hewitt, II
(74) *Attorney, Agent, or Firm* — Hickman Palermo Becker Bingham LLP; Kevin W. Miller

(57) ABSTRACT

A sewer extender useful with recreational vehicles to connect vehicle sewer discharge connectors to ground connectors comprises, in one embodiment, a tubular main body having a proximal end and a distal end; the distal end having a plurality of external threads comprising a plurality of thread segments that are defined by a plurality of spaced-apart relief cuts; a tubular telescoping body adapted to slide into the tubular main body via the distal end; a compression nut having tapered internal threads that are configured to threadedly attach to the plurality of thread segments, and when tightened, to compress the thread segments against the telescoping body to fix the telescoping body in a fixed position with respect to the main body accommodating multiple heights of recreational vehicles. The main body can be configured to articulate at different degrees to allow for multiple connections at different ground level sewer connections.

11 Claims, 10 Drawing Sheets

(56) References Cited

U.S. PATENT DOCUMENTS

| | | |
|---|---|---|
| 7,036,524 B2 | 5/2006 | Kennedy |
| 7,156,574 B1 * | 1/2007 | Garst ............... B60R 15/00 |
| | | 137/181 |
| 7,174,921 B1 | 2/2007 | Wiltse |
| D564,076 S | 3/2008 | Brockington |
| 8,465,059 B1 | 6/2013 | Price |
| 8,479,776 B2 * | 7/2013 | Berardi ............. F16L 11/00 |
| | | 138/109 |
| 8,777,274 B2 * | 7/2014 | Chou ............. F16L 27/1274 |
| | | 285/302 |
| 2004/0112448 A1 | 6/2004 | Faahs |
| 2007/0052235 A1 | 3/2007 | Buff |
| 2007/0235096 A1 | 10/2007 | Nielsen |
| 2008/0224468 A1 | 9/2008 | Dohm |
| 2009/0236001 A1 | 9/2009 | Damaske |
| 2010/0018590 A1 | 1/2010 | Damaske |
| 2011/0148093 A1 * | 6/2011 | Choi ............... F16L 37/0927 |
| | | 285/32 |
| 2013/0056976 A1 * | 3/2013 | Kim ............... F16L 37/0925 |
| | | 285/32 |
| 2013/0249206 A1 * | 9/2013 | Chou ............... F16L 19/065 |
| | | 285/32 |
| 2014/0318671 A1 | 10/2014 | Swarts |
| 2016/0061359 A1 | 3/2016 | Grech |
| 2017/0175934 A1 | 6/2017 | Bledsoe |

OTHER PUBLICATIONS

Wright, U.S. Appl. No. 29/648,232, filed May 18, 2018, Final Office Action, dated Apr. 6, 2020.

* cited by examiner

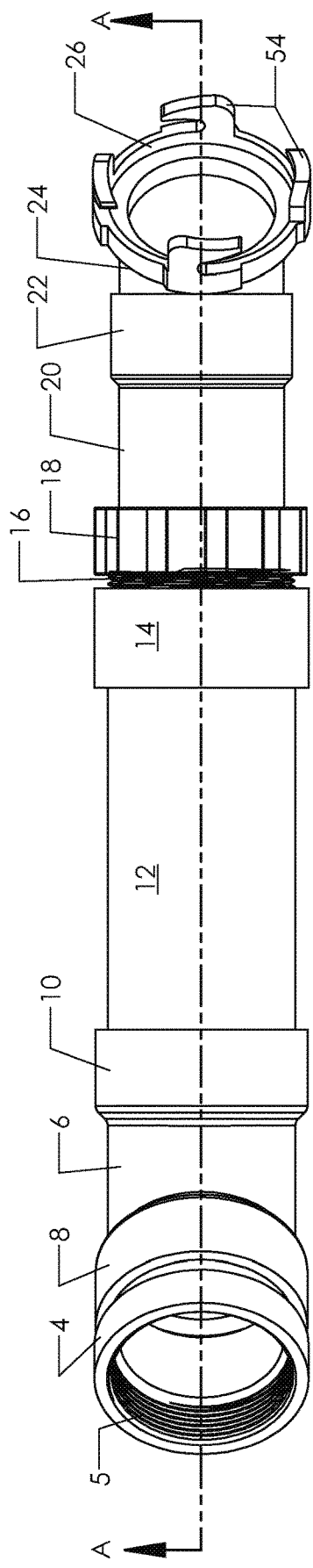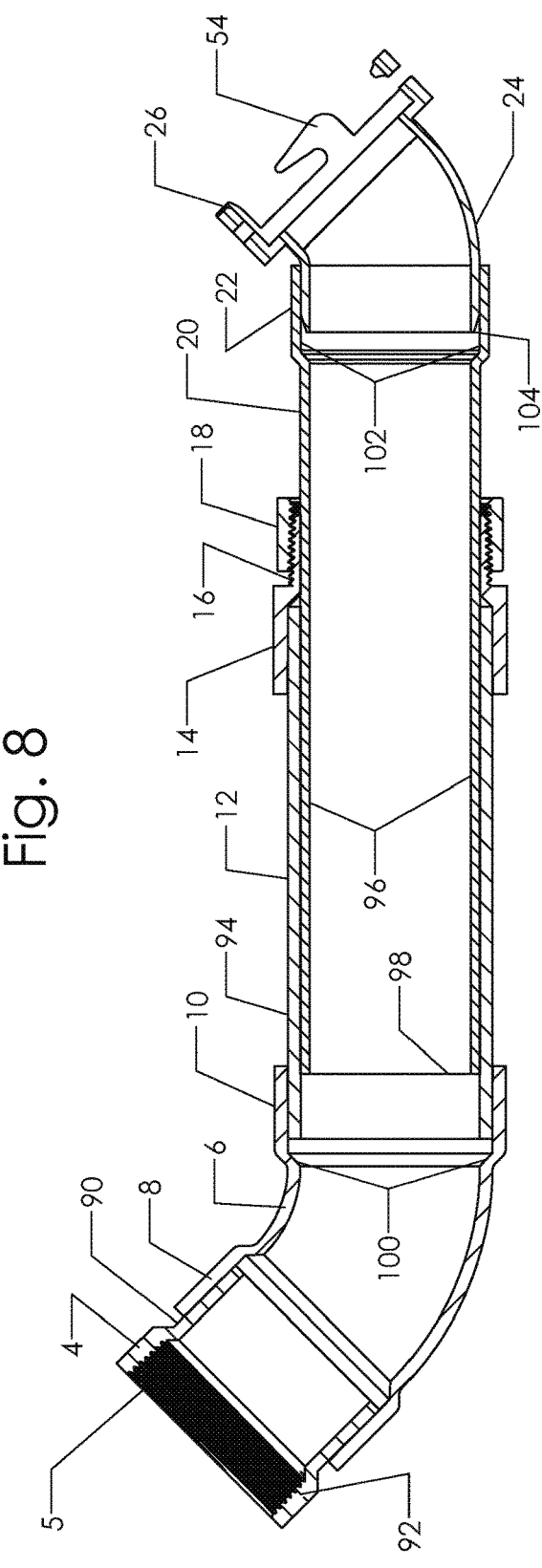
Fig. 8
Fig. 9

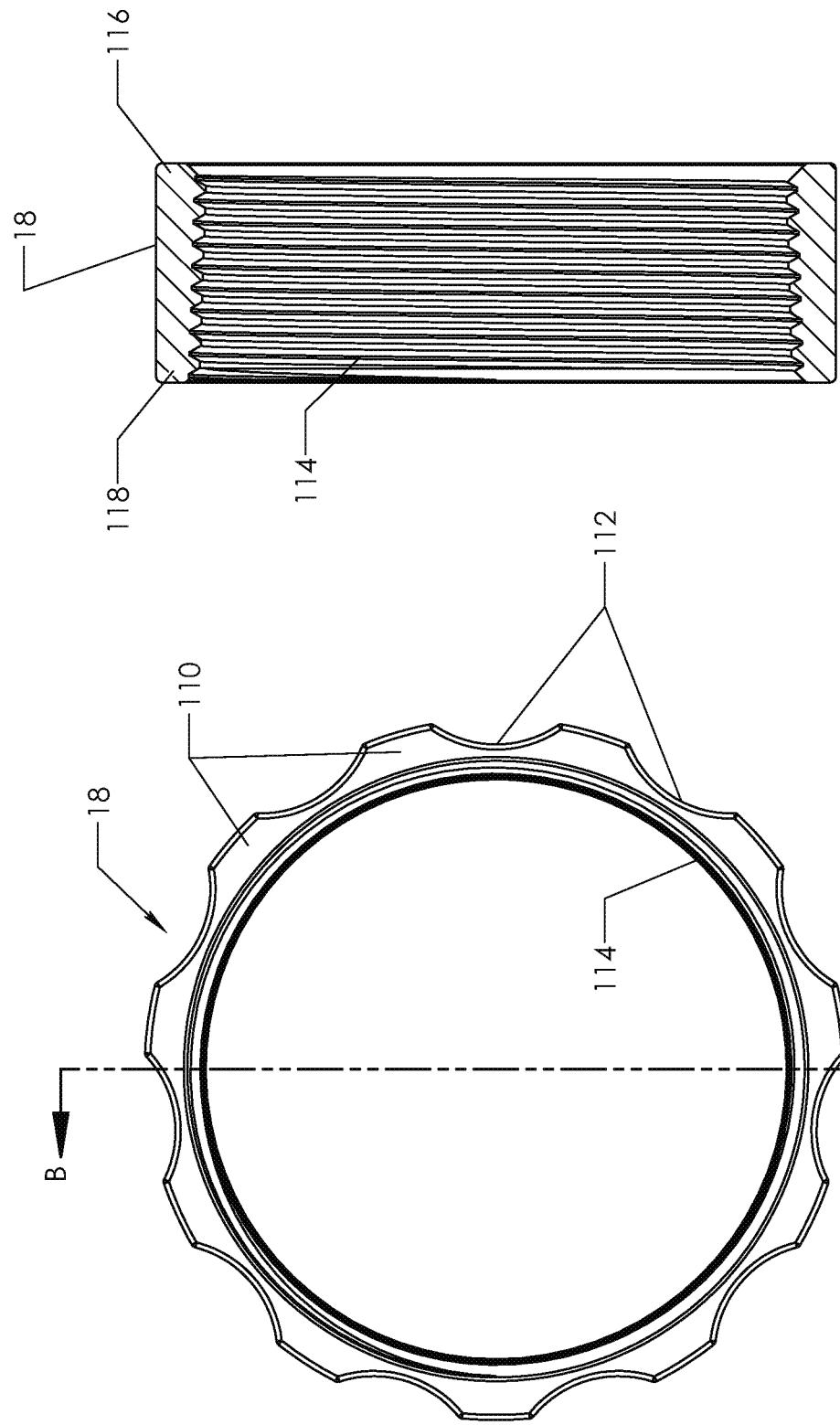

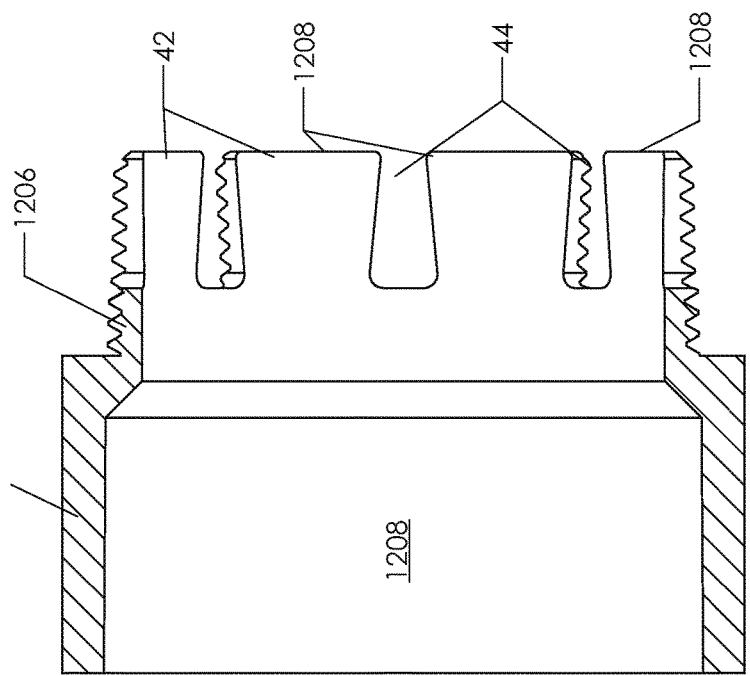
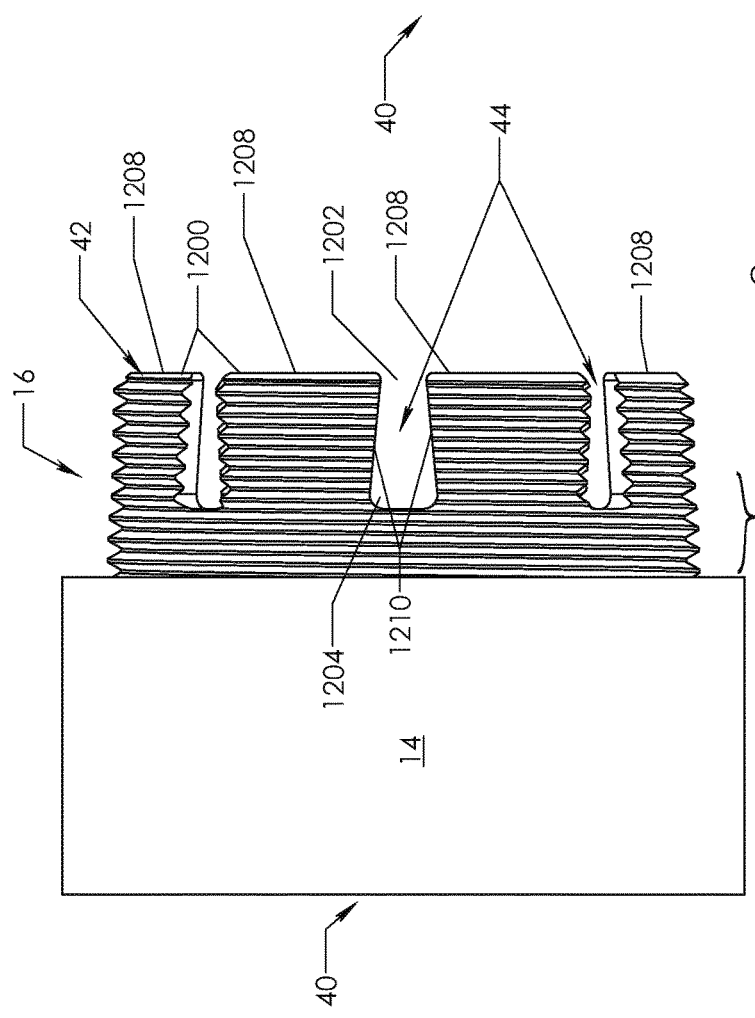
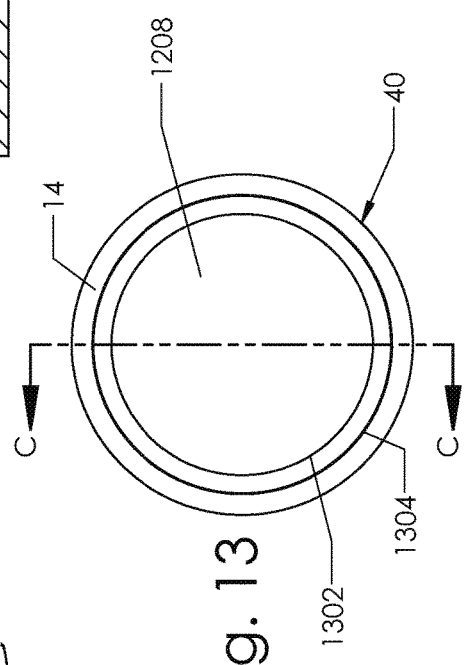

EXTENDER FOR VEHICLE SEWER CONNECTION

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever. Copyright © 2018 Jeffery Wright.

FIELD OF THE DISCLOSURE

The present disclosure is in the technical fields of pipe or conduit fittings, adapters or couplings, especially those for use with sanitary sewer connections. Another technical field is hookup accessories for recreational vehicles.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many recreational vehicles are fitted with lavatories or water closets that route waste to storage tanks via internal piping that terminates in a sewer line connection near the exterior of the vehicle, often on the underside or chassis of the vehicle. Often the sewer line connection is oriented horizontally or parallel with respect to the ground. Parking locations for recreational vehicles commonly include subterranean sewer lines, tanks or other recovery facilities that terminate in connectors that are at or just above ground level. To discharge waste from the storage tanks to the external subterranean sewer line, tank or other recovery facility, it is necessary to connect the sewer connection of the vehicle to the ground connector of the parking location. The typical approach is to connect a large-diameter flex hose between the connections.

However, this approach has numerous known problems. Because of the lateral separation of the vehicle sewer connection and the connector of the parking location, the hose may fold or kink, causing blockage. The hose may need to traverse uneven ground or cross curbing or other obstructions, resulting in the need to support the hose to ensure a continuously downward drainage path. Consequently, there is a need for a better way to adapt vehicle sewer line connections to ground connections.

SUMMARY

The appended claims may serve as a summary of the invention.

BRIEF DESCRIPTION OF THE DRAWINGS

In the drawings:

FIG. 8 is a bottom plan view of the extender of FIG. 1, shown in a retracted position and taken plumb with respect to a main body, according to an embodiment;

FIG. 9 is a section view taken along line A-A of FIG. 8;

FIG. 10 is an end view of a compression nut of the extender of FIG. 1, according to an embodiment;

FIG. 11 is a section view taken along line B-B of FIG. 10;

FIG. 12 is a side view of an adapter flange of the extender of FIG. 1, shown in an extended position, according to an embodiment;

FIG. 13 is an end view of the adapter flange of FIG. 12;

FIG. 14 is a section view taken along line C-C of FIG. 13.

DETAILED DESCRIPTION

Figure 1:
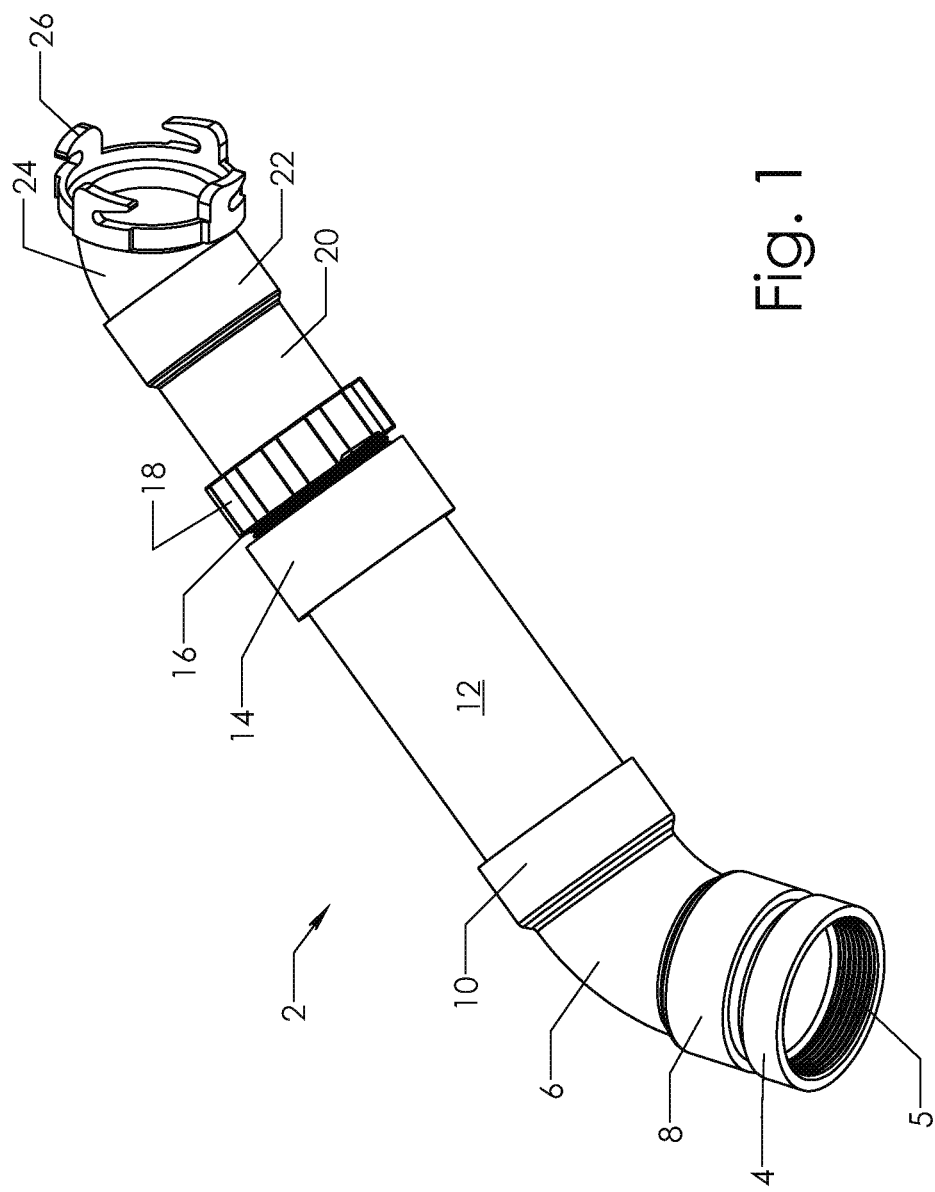
FIG. 1 is a perspective view of an extender for vehicle sewer connection, shown in a retracted or collapsed position, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a sewer extender comprises a tubular main body having a proximal end and a distal end; the distal end having a plurality of external threads comprising a plurality of thread segments that are defined by a plurality of spaced-apart relief cuts; a tubular telescoping body adapted to slide into the tubular main body via the distal end; a compression nut having tapered internal threads that are configured to threadedly attach to the plurality of thread segments.

In one feature, the sewer extender further comprises an adapter affixed to the proximal end of the main body and configured to couple to a sewer connection of a vehicle. In this context, a vehicle may be a recreational vehicle, truck, coach, bus or any other vehicle that may have a tank or other vessel for temporary storage of lavatory waste prior to discharge to another facility. In another feature, a 45-degree adapter is affixed to the proximal end of the main body and configured to couple to a sewer connection of a recreational vehicle. In a further feature, the telescoping body has a proximal end, elongated walls enclosing an interior cavity and a distal end, the telescoping body further comprises a coupling affixed to the distal end of the telescoping body and is configured to couple to a hose or sewer connection at a campsite. In still another feature, the telescoping body has a proximal end, elongated walls enclosing an interior cavity and a distal end, the telescoping body further comprising a 45-degree coupling that is affixed to the distal end of the telescoping body and having a bayonet flange that is configured to couple to a hose fitting.

In one embodiment, the main body comprises three-inch inside diameter ABS pipe and the telescoping body comprising three inch outside diameter aluminum tubing.

In one embodiment, the external threads further comprise a base section of circumferential threads, the base section being integrally formed with the plurality of thread segments. Each of the thread segments in the plurality of thread segments may be defined by the relief cuts each comprising a recess having a wider base opening, inwardly tapered spaced-apart edges and a narrower opening that is coextensive with the distal end. The external threads may be inwardly tapered, wherein the base section has a first circumferential dimension that is larger than a second circumferential dimension around the thread segments.

In another embodiment, a sewer extender comprises a tubular main body having a proximal end and a distal end; an adapter affixed to the proximal end of the main body and configured to couple to a sewer connection of a vehicle; the distal end of the main body having a plurality of external threads comprising a plurality of thread segments that are defined by a plurality of spaced-apart relief cuts; the external threads comprising a base section of circumferential threads, the base section being integrally formed with the plurality of thread segments; each of the thread segments in the plurality of thread segments being defined by the relief cuts each comprising a recess having a wider base opening, inwardly tapered spaced-apart edges and a narrower opening that is coextensive with the distal end; the external threads being inwardly tapered, wherein the base section has a first circumferential dimension that is larger than a second circumferential dimension around the thread segments; a tubular telescoping body adapted to slide into the tubular main body via the distal end, the telescoping body having a proximal end, elongated walls enclosing an interior cavity and a distal end of the telescoping body, the telescoping body further comprising a coupling affixed to the distal end of the telescoping body and configured to couple to a hose or ground sewer connection of a ground location; a compression nut having tapered internal threads that are configured to threadedly attach to the plurality of thread segments; the main body comprising three inch inside diameter ABS pipe and the telescoping body comprising three inch outside diameter aluminum tubing.

Other embodiments, features and aspects will become apparent from the description, drawings and disclosure as a whole.

Glossary

In the description and drawings, the following terms correspond to the following reference numerals:

| | |
|---|---|
| sewer extender | 2 |
| bell fitting | 4 |
| elbow adapter | 6 |
| first end coupling | 8 |
| second end coupling | 10 |
| main body | 12 |
| third end coupling | 14 |
| outwardly extending external threads | 16 |
| compression nut | 18 |
| telescoping body | 20 |
| fourth end coupling | 22 |
| hose elbow coupling | 24 |
| bayonet flange | 26 |
| proximal end of bell fitting | 30 |
| distal end of bell fitting | 34 |
| proximal end of main body | 36 |

-continued

| | |
|---|---|
| distal end of main body | 38 |
| proximal opening of third end coupling | 40 |
| distal end of coupling | 42 |
| relief cuts | 44 |
| proximal end of telescoping body | 46 |
| outer surface of telescoping body | 48 |
| proximal end of hose elbow coupling | 50 |
| distal end of hose coupling | 51 |
| segment of telescoping body | 52 |
| bayonet pawls | 54 |
| pawl tooth | 56 |
| pawl body | 57 |
| engagement recess | 58 |
| elongated interior cavity | 70 |
| proximal flange | 92 |
| distal shoulder | 90 |
| outer walls of main body | 94 |
| elongated walls telescoping tube | 96 |
| end of telescoping tube | 98 |
| interior shoulders | 100 |
| distal walls | 102 |
| proximal end | 104 |
| Knurled ends | 110 |
| finger grip recesses | 112 |
| internal threads | 114 |
| first end or opening | 116 |
| second opening | 118 |
| thread segments | 1200 |
| narrower opening of relief cut | 1202 |
| wider base opening of relief cut | 1204 |
| base section | 1206 |
| distal tips of thread segments | 1208 |

Structural and Functional Example

Figure 2:
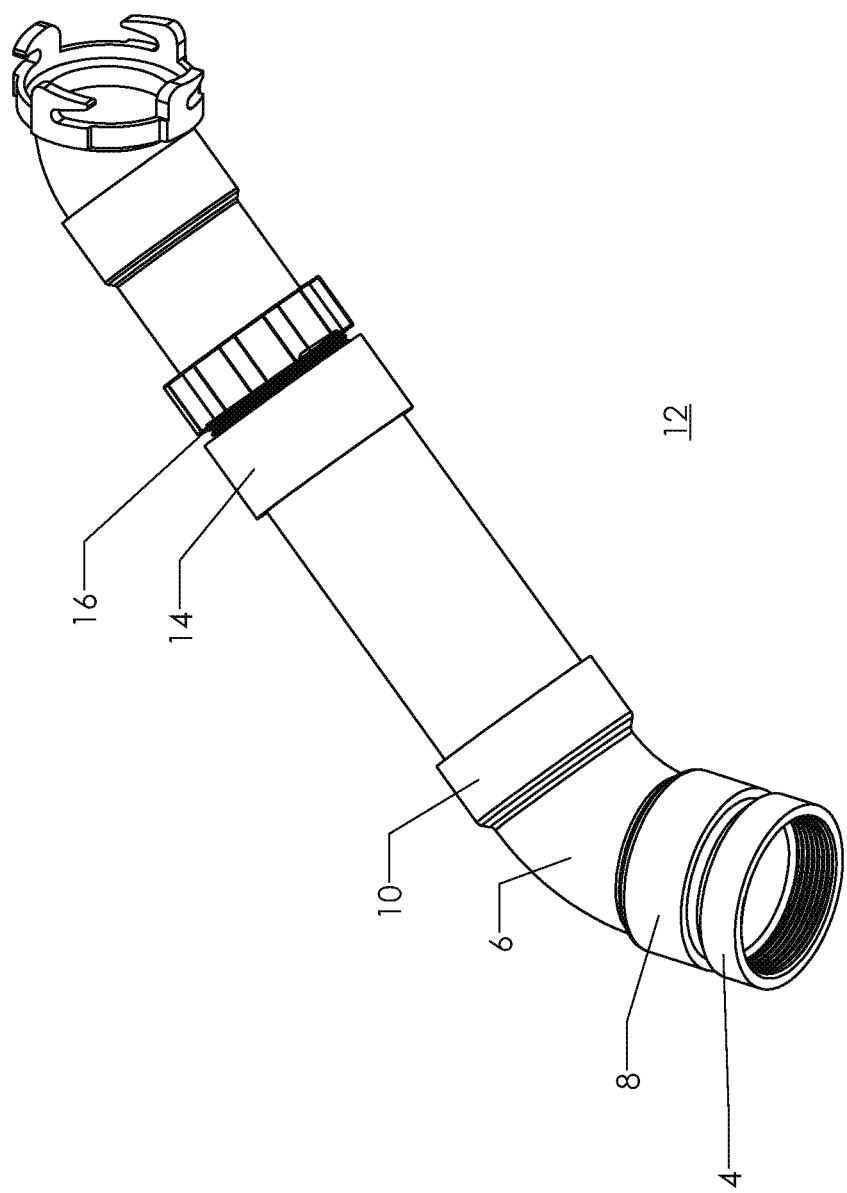
FIG. 2 is a perspective view of the extender of FIG. 1, shown in an extended position, according to an embodiment.

FIG. 1 is a perspective view of an extender for vehicle sewer connection, shown in a retracted or collapsed position, according to one embodiment; FIG. 2 is a perspective view of the extender of FIG. 1, shown in an extended position, according to an embodiment. Referring first to FIG. 1, in one embodiment, a sewer extender 2 comprises the combination of a bell fitting 4, an elbow adapter 6 having a first end coupling 8 and a second end coupling 10, a main body 12 having a third end coupling 14 having outwardly extending external threads 16, a compression nut 18, a telescoping body 20 having a fourth end coupling 22, and a hose elbow coupling 24 having bayonet flange 26.

All of bell fitting 4, elbow adapter 6, main body 12, coupling 14, compression nut 18, telescoping body 20, coupling 22, and hose elbow coupling 24 are generally hollow cylinders, tubes or pipe segments having open interior cavities through which water or solid waste may pass when the sewer extender 2 is assembled, installed and operational. In an embodiment, elbow adapter 6 is a 45-degree adapter and vehicle elbow coupling is a 45-degree coupling; in other embodiments, straight couplings and adapters may be used or the angle may be other than 45 degrees.

In an embodiment, telescoping body 20 comprises an elongated tubular element having a first outer diameter to which the fourth end coupling 22 is either affixed or integrally formed. Telescoping body 20 fits within compression nut 18 and extends through that nut, the third end coupling 14 and within the main body 12. In an embodiment, compression nut 18 may be tightened on threads 16 of the third end coupling 14 to cause compression of that coupling to hold telescoping body 20. In an embodiment, compression nut 18 may be tightened on threads 16 to hold telescoping body 20 in a fully collapsed position as seen in FIG. 1, or in a fully extended position as seen in FIG. 2, or in a position between the fully collapsed position or fully extended position.

Figure 3:
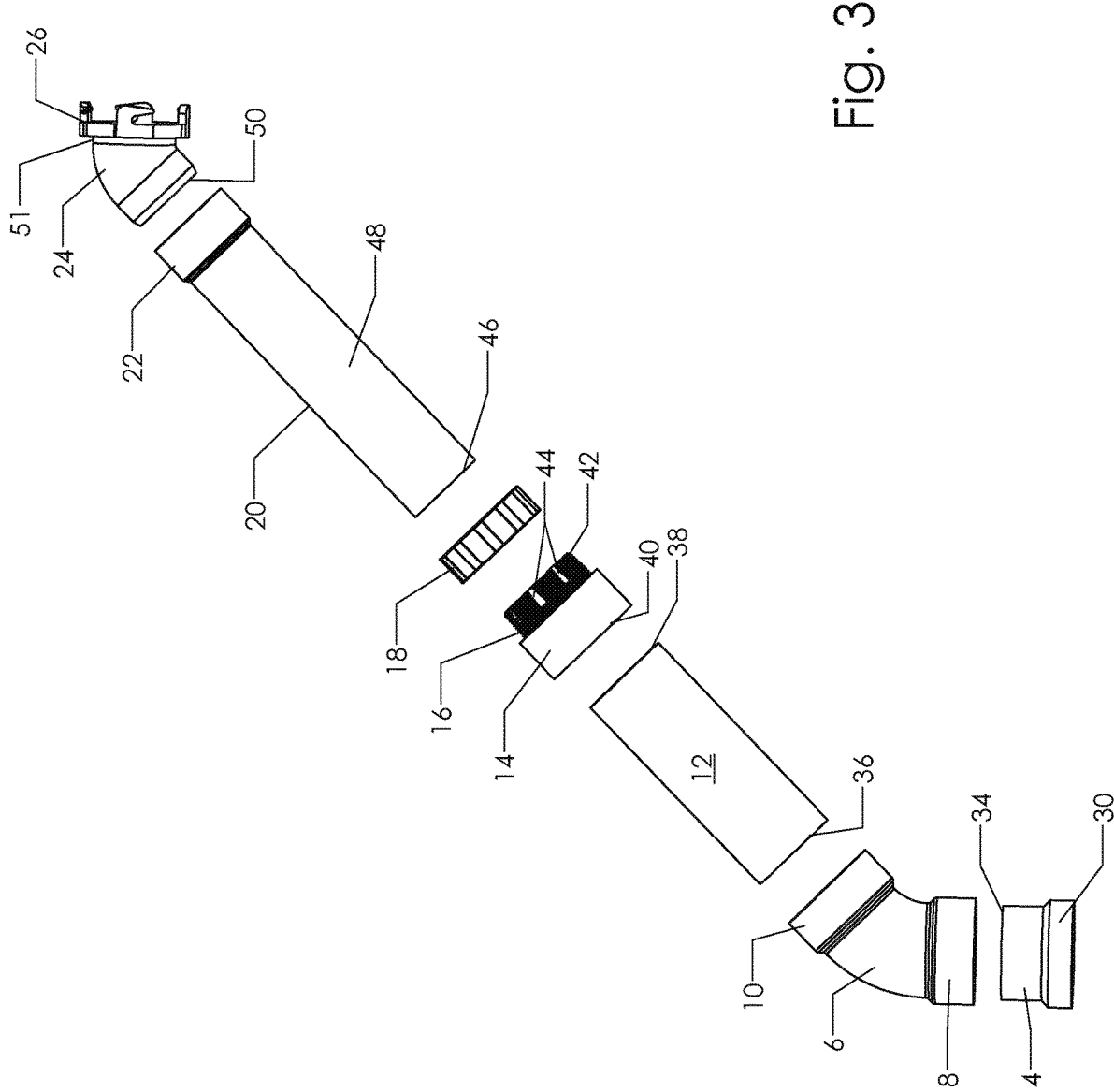
FIG. 3 is an exploded view of the extender of FIG. 1, according to an embodiment.

FIG. 3 is an exploded view of the extender of FIG. 1, shown in an extended position, according to an embodiment. The sewer extender 2 may be formed by affixing a distal end 34 of bell fitting 4, which also has proximal end 30, inside the first end coupling 8 of elbow adapter 6. In an embodiment, coupling 4 and adapter 6 are formed of ABS plastic and a compatible ABS adhesive may be used. The second end coupling 10 of elbow adapter 6 similarly may be joined over a proximal end 36 of the main body 12. A distal end 38 of main body 12 may be affixed within a proximal opening 40 of the third end coupling 14.

Main body 12 and coupling 14 also may comprise ABS and may be affixed using adhesive. For example, ABS pipe and pipe fittings having a nominal three-inch inside diameter and compatible coupler, adapter, neck and shoulder sizes may be used. Telescoping body 20 may comprise three-inch outside diameter aluminum tube or pipe in one embodiment to telescope snugly into three-inch inside diameter main body 12 and coupling 14. The particular outside diameter and inside diameter of different embodiments are not critical and a wide range of sizes may be used depending on connections of the vehicle and ground. Dimensions herein are approximate and variation is to be expected.

While ABS and aluminum have been mentioned, alternatively other plastics such as PVC may be used, or metals, or other suitable rigid materials.

In yet another alternative, all of the coupling 4, adapter 6, body 12, and coupling 14 may be integrally formed as a single unit without separate parts or joints. Further, fasteners such as screws may be substituted for adhesive. What is important is that the tube, pipe, couplings and other parts illustrated in the disclosure are capable of watertight assembly while still permitting the telescoping body 20 to be adjusted to different lengths of extension and the main body to articulate at angles of different degrees as further described.

In an embodiment, compression nut 18 is placed over a distal end 42 of coupling 14 and rotated onto the upstanding threads 16 of coupling 14. In an embodiment, compression nut 18 is formed of cast or machined aluminum, steel or other metal, but plastics may be used alternatively. Telescoping body 20 has an outer diameter that is formed to facilitate a slip fit through the compression nut 18 so that a proximal end 46 of the telescoping body will enter and slide deeply into the main body 12. Compression nut 18 is formed with internally tapered threads, and the upstanding threads 16 of coupling 14 are divided into thread segments 1200 that are defined by a plurality of relief cuts 44.

Therefore, threading the compression nut 18 onto the upstanding threads 16 of coupling 14 causes compression of gaps between parts of the threads of the coupling, forming a tight grip of the threads of the coupling against an outer surface 48 of the telescoping body 20. This assembly is made without adhesive or other fixative to permit periodically tightening or releasing compression nut 18 to permit sliding the telescoping body 20 to any of a plurality of different positions and degrees within the nut, coupling 14 and main body 12.

In this manner, the sewer extender 2 is adjustable to a plurality of different overall lengths. The adjustability of sewer extender 2 permits the apparatus to adapt to vehicles having sewer connectors located at different heights with respect to ground level. For example, recreational vehicles of different makes or models are made in many different heights and therefore the adjustability of the sewer extender 2 provides the benefit of adaptability to Class A motorhomes, Class C motorhomes, fifth-wheel vehicles or trailers.

In an embodiment, the fourth end coupling 22 of telescoping body 20 is affixed to a proximal end 50 of hose elbow coupling 24 using adhesive or fasteners. In an embodiment, bayonet flange 26 is rotatable on the hose elbow coupling 24 at end 51 to permit engaging and snugly gripping a compatible hose fitting or ground sewer connection of a vehicle parking location, recovery tank or other discharge location. At the other end, coupling 4 may comprise internal threads 5 that are capable of threaded attachment to an external hose, pipe or fitting to which waste is discharged.

Figure 4:
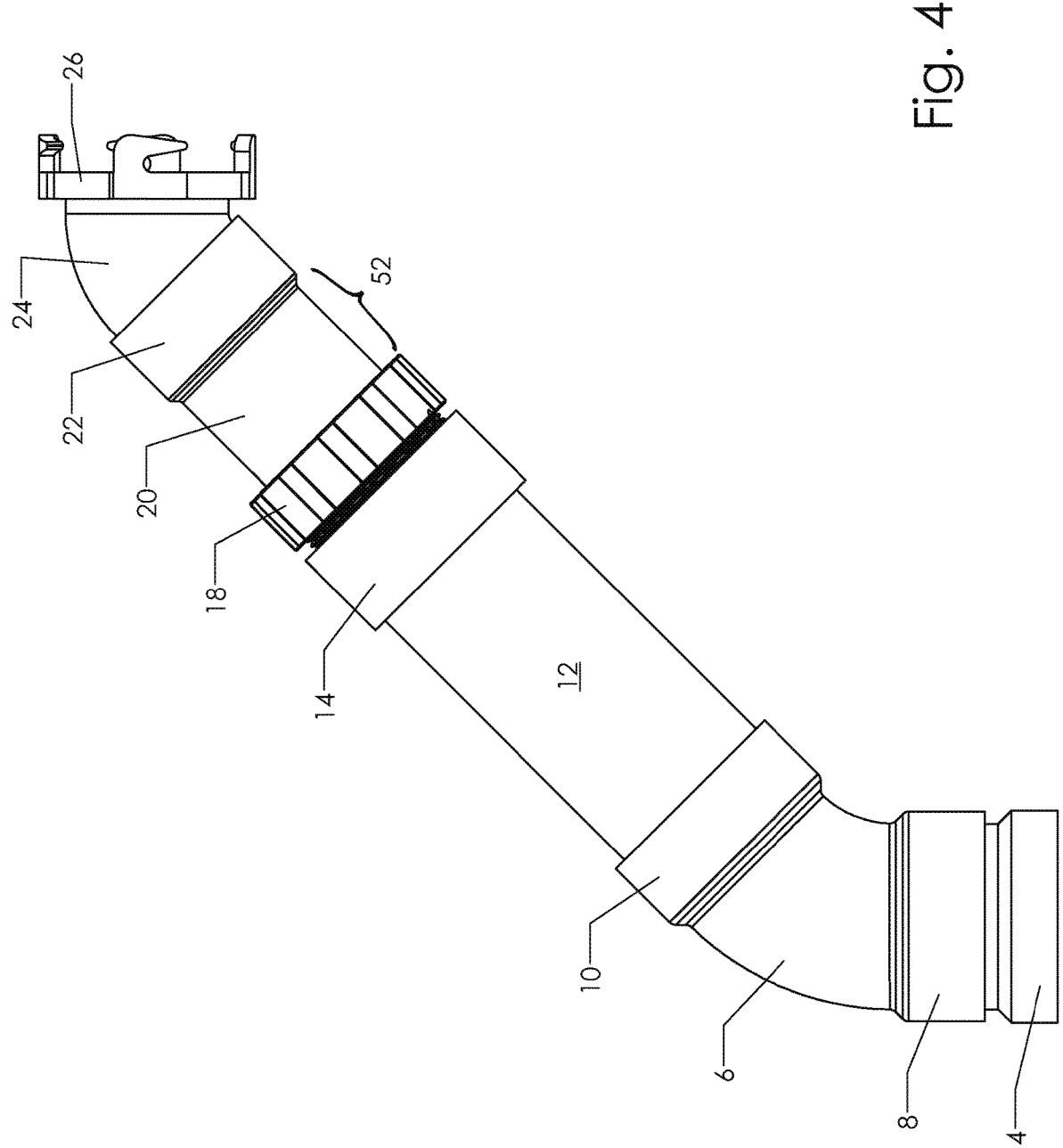
FIG. 4 is a side elevation view of the extender of FIG. 1, shown in a retracted position, according to an embodiment.

FIG. 4 is a side elevation view of the extender of FIG. 1, shown in a retracted position, according to an embodiment. FIG. 4 shows telescoping body 20 retracted into the main body 12 through compression nut 18 and coupling 14, such that a segment 52 of the telescoping body 20 having relatively small longitudinal dimension extends outside the compression nut 18. This position is similar to FIG. 1, and contrasts with FIG. 2 in which the telescoping body is extended.

Figure 5:
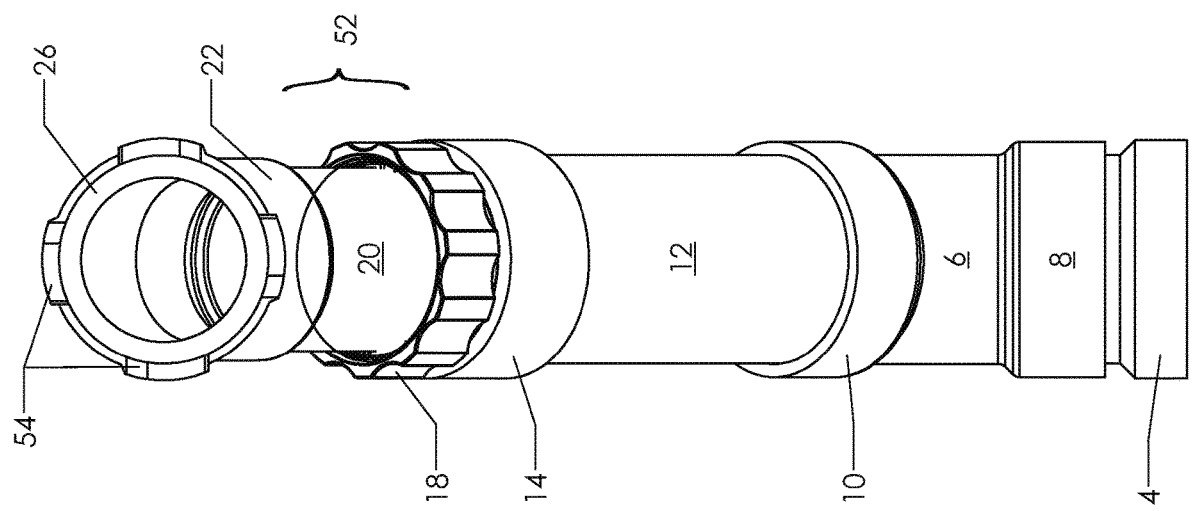
FIG. 5 is a front elevation view of the extender of FIG. 1, shown in a retracted position, according to an embodiment.

FIG. 5 is a front elevation view of the extender of FIG. 1, shown in a retracted position, according to an embodiment. FIG. 5 corresponds to the orientation of FIG. 1, FIG. 4 in which telescoping body 20 is retracted through compression nut 18, coupling 14 and main body 12. FIG. 5 shows that in one embodiment, bayonet flange 26 may comprise a plurality of spaced apart bayonet pawls 54 of which four (4) are shown in the example of FIG. 5. Other embodiments may use more or fewer bayonet pawls. Other embodiments may use a rotatable nut rather than a bayonet flange for attachment to a vehicle or other external parts or equipment and the use of a rotatable bayonet attachment is merely an example.

Figure 6:
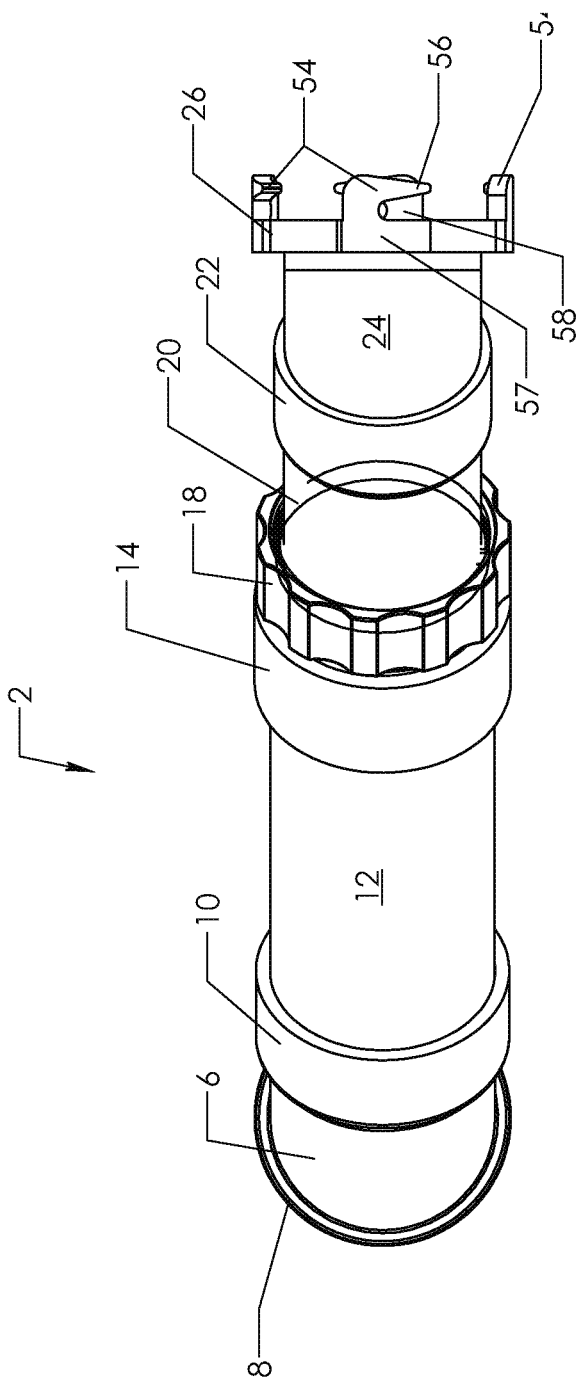
FIG. 6 is a top plan view of the extender of FIG. 1, shown in a retracted position, taken plumb to a first end coupling, according to an embodiment.

FIG. 6 is a top plan view of the extender of FIG. 1, shown in a retracted position, taken plumb to a first end coupling, according to an embodiment. In an embodiment, each of the bayonet pawls 54 may comprise a bluntly pointed tooth 56 extending from and spaced apart from a body 57 to define an engagement recess 58. With this structure, the bayonet flange 26 may be brought into contact with a compatible hose fitting or ground sewer connection of a vehicle parking location, recovery tank or other discharge location and having compatible pins or studs that extend outwardly from a perimeter surface of the connection, then rotated firmly about the hose elbow coupling 24 to drive the teeth 56 against the pins or studs, forcing them into a snug grip by the recesses 58 and thereby holding the flange 26 tightly against the discharge connection.

Figure 7:
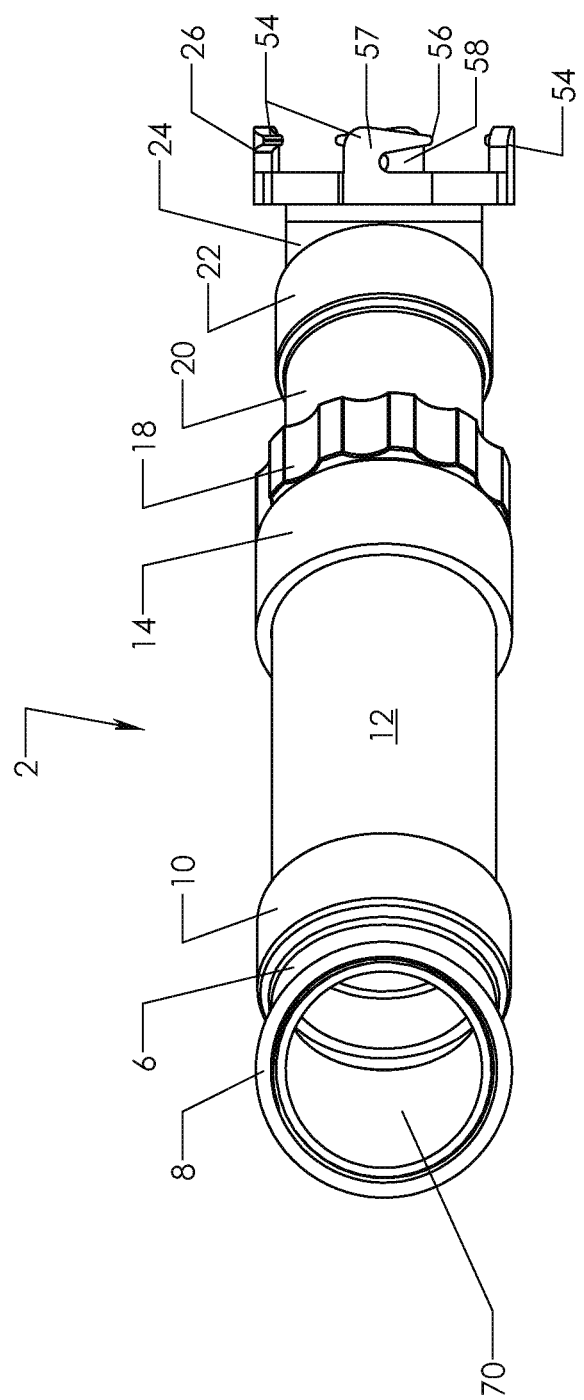
FIG. 7 is a bottom plan view of the extender of FIG. 1, shown in a retracted position, taken plumb to a first end coupling and in reverse compared to FIG. 6, according to an embodiment.

FIG. 7 is a bottom plan view of the extender of FIG. 1, shown in a retracted position, taken plumb to a first end coupling and in reverse compared to FIG. 6, according to an embodiment. FIG. 7 shows that the use of pipe couplings, pipe segments or other tubular elements provides an elongated interior cavity 70 through the entire length of the sewer extender 2 to permit flow of waste through the apparatus.

FIG. 8 is a bottom plan view of the extender of FIG. 1, shown in a retracted position and taken plumb with respect to a main body, according to an embodiment; FIG. 9 is a section view taken along line A-A of FIG. 8. Referring to FIG. 9, in an embodiment, bell fitting 4 comprises a proximal flange 92 in which interior threads 5 are formed, joined integrally to or formed with a distal shoulder 90 having a reduced outer diameter to fit snugly within an interior of first end coupling 8 of elbow adapter 6. In some embodiments, installation of the sewer extender 2 to a vehicle, such as a recreational vehicle, may comprise affixing the bell fitting 4 to an existing sewer discharge connection of the vehicle, optionally using epoxy, other adhesives, silicone sealant or other means for affixing the extender to the vehicle. The elbow adapter 6 also may be seen to have a reduced outer diameter such that a larger diameter of the second end coupling 10 fits snugly over outer walls 94 of the main body 12. Similarly, third end coupling 14 is formed with a larger inner and outer diameter to fit snugly over the outer walls 94 of main body 12.

Furthermore, external threads 16 may be seen to have a tapered profile from left to right in the drawing figure and are formed to be compatible for threading into the compression nut 18 which when tightened will cause compression of the external threads 16 of third end coupling 14. Telescoping body 20 comprises longitudinally elongated walls 96 that may extend fully within the main body 12 and may terminate in an end 98 that may, when the telescoping body is fully retracted, rest against interior shoulders 100 of elbow adapter 6. Telescoping body 20 further comprises distal walls 102 that define an enlarged diameter of fourth end coupling 22 to snugly receive a proximal end 104 of the hose elbow coupling 24.

FIG. 10 is an end view of a compression nut of the extender of FIG. 1, according to an embodiment; FIG. 11 is a section view taken along line B-B of FIG. 10. Referring first to FIG. 10, in an embodiment, the compression nut 18 comprises a plurality of upstanding stop elements 110 that are separated by and defined by a plurality of finger grip recesses 112, which alternate with the stop elements around a circumference or perimeter of the compression nut. This configuration facilitates hand gripping and turning the compression nut to engage and compress threads. In an embodiment, compression nut 18 comprises internal threads 114 that are compatible with external threads 16 of third end coupling 14. Referring now to FIG. 11, in section it may be seen that internal threads 114 are slightly tapered inwardly when FIG. 11 is viewed from left to right, so that an internal diameter of the compression nut 18 is smaller at a first end or opening 116 as compared to a second opening 118.

FIG. 12 is a side view of an adapter flange of the extender of FIG. 1, shown in an extended position, according to an embodiment; FIG. 13 is an end view of the adapter flange of FIG. 12; FIG. 14 is a section view taken along line C-C of FIG. 13. Referring first to FIG. 12, the diagram shows in greater detail the upstanding threads 16 of coupling 14 divided into thread segments 1200 that are defined by a plurality of relief cuts 44. In an embodiment, relief cuts 44 each comprise a narrower opening 1202 that tapers rearwardly or downwardly to a wider base opening 1204. Furthermore, in an embodiment, each of the thread segments in the plurality of thread segments may be defined by the relief cuts each comprising a recess having the wider base opening 1204, inwardly tapered spaced-apart edges 1210 and the narrower opening 1202 that is coextensive with the distal end.

This arrangement permits each of the thread segments 1200 to compress radially inwardly under pressure from the compression nut 18 when the nut is threaded on to the threads 16. With such pressure, distal tips 1208 of thread segments 1200 are urged inwardly and therefore compress against outer surfaces of walls 96 of the telescoping body 20, as best seen in FIG. 9. Thus, the compression nut having tapered internal threads is configured to threadedly attach to the plurality of thread segments, and when tightened, to compress the thread segments against the telescoping body to fix the telescoping body in a fixed position with respect to the main body.

In an embodiment, threads 16 further comprise at least one base section 1206 of continuously formed circumferential threads that are not interrupted by relief cuts. In an embodiment, the base section of circumferential threads is integrally formed with the plurality of thread segments. Furthermore, in an embodiment, the external threads 16 are tapered inwardly toward an imaginary center line of the third end coupling 14. In this arrangement, the base section 1206 has a first circumferential dimension 1304 as seen in FIG. 13 that is larger than a second circumferential dimension 1302 around the thread segments, also as seen in FIG. 13.

Furthermore, the structure described herein is efficient, fast and convenient to use. The compression nut 18 allows for the proper function of the telescoping sewer extender 2. Using 3" O.D. aluminum tube inserted into a 3" I.D. ABS sewer pipe, easy adjustment is possible to lengthen or shorten the sewer extender to accommodate different elevations of campsites or other ground locations. The sewer extender also allows for easy articulation of the main body to align at angles of different degrees with ground level sewer connections. Embodiments provide easy setup for recreational users and also permit users to cease usage more quickly and have a more sanitary way to clean and store sewer pipes and connections as compared to the past approaches reviewed in the Background.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A sewer extender comprising:
a tubular main body having a proximal end and a distal end;
the distal end having a plurality of external threads, the plurality of external threads comprising a base section of circumferential threads and a plurality of thread segments that are defined by a plurality of spaced-apart relief cuts, the base section of circumferential threads being integrally formed with the plurality of thread segments, each of the thread segments in the plurality of thread segments being defined by the spaced-apart relief cuts, each spaced-apart relief cut comprising a recess having a wider base opening and inwardly tapered spaced-apart edges extending to the tip of the distal end to form a narrower opening that is coextensive with the distal end;
a tubular telescoping body adapted to slide into the tubular main body via the distal end and through the thread segments;
a compression nut having tapered internal threads that are configured to threadedly attach to the plurality of thread segments, and when tightened, to compress the thread segments against the telescoping body to fix the telescoping body in a fixed position with respect to the main body.

2. The sewer extender of claim 1, further comprising an adapter affixed to the proximal end of the main body and configured to couple to a sewer connection of a vehicle.

3. The sewer extender of claim 1, further comprising a 45-degree adapter affixed to the proximal end of the main body and configured to couple to a sewer connection to discharge sewage from a recreational vehicle to a sewer connection at ground level.

4. The sewer extender of claim 1, the telescoping body having a proximal end, elongated walls enclosing an interior cavity and a distal end, the telescoping body further comprising a coupling affixed to the distal end of the telescoping body and configured to couple to a hose or ground sewer connection of a ground location.

5. The sewer extender of claim 1, the telescoping body having a proximal end, elongated walls enclosing an interior cavity and a distal end, the telescoping body further comprising a 45-degree coupling that is affixed to the distal end of the telescoping body and having a bayonet flange that is configured to couple to a recreational vehicle.

6. The sewer extender of claim 1, the main body comprising three inch inside diameter ABS pipe and the telescoping body comprising three inch outside diameter aluminum tubing.

7. The sewer extender of claim 1, the external threads being inwardly tapered, wherein the base section has a first circumferential dimension that is larger than a second circumferential dimension around the thread segments.

8. A sewer extender comprising:
   a tubular main body having a proximal end and a distal end;
   an adapter affixed to the proximal end of the main body and configured to couple to a sewer connection of a vehicle;
   the distal end of the main body having a plurality of external threads, the plurality of external threads comprising a base section of circumferential threads and a plurality of thread segments that are defined by a plurality of spaced-apart relief cuts, the base section of circumferential threads being integrally formed with the plurality of thread segments;
   each of the thread segments in the plurality of thread segments being defined by the relief cuts each comprising a recess having a wider base opening and inwardly tapered spaced-apart edges extending to the tip of the distal end to form a narrower opening that is coextensive with the distal end;
   the external threads being inwardly tapered, wherein the base section has a first circumferential dimension that is larger than a second circumferential dimension around the thread segments;
   a tubular telescoping body adapted to slide into the tubular main body via the distal end, the telescoping body having a proximal end, elongated walls enclosing an interior cavity and a distal end of the telescoping body, the telescoping body further comprising a coupling affixed to the distal end of the telescoping body and configured to couple to a hose or ground sewer connection of a ground location;
   a compression nut having tapered internal threads that are configured to threadedly attach to the plurality of thread segments;
   the main body comprising three inch inside diameter ABS pipe and the telescoping body comprising three inch outside diameter aluminum tubing.

9. The sewer extender of claim 8, the compression nut having tapered internal threads that are configured to threadedly attach to the plurality of thread segments, and when tightened, to compress the thread segments against the telescoping body to fix the telescoping body in a fixed position with respect to the main body.

10. The sewer extender of claim 8, further comprising a 45-degree adapter affixed to the proximal end of the main body and configured to couple to a sewer connection of a recreational vehicle.

11. The sewer extender of claim 8, the telescoping body further comprising a 45-degree coupling that is affixed to the distal end of the telescoping body and having a bayonet flange that is configured to couple to a recreational vehicle.

\* \* \* \* \*